Figure 3:
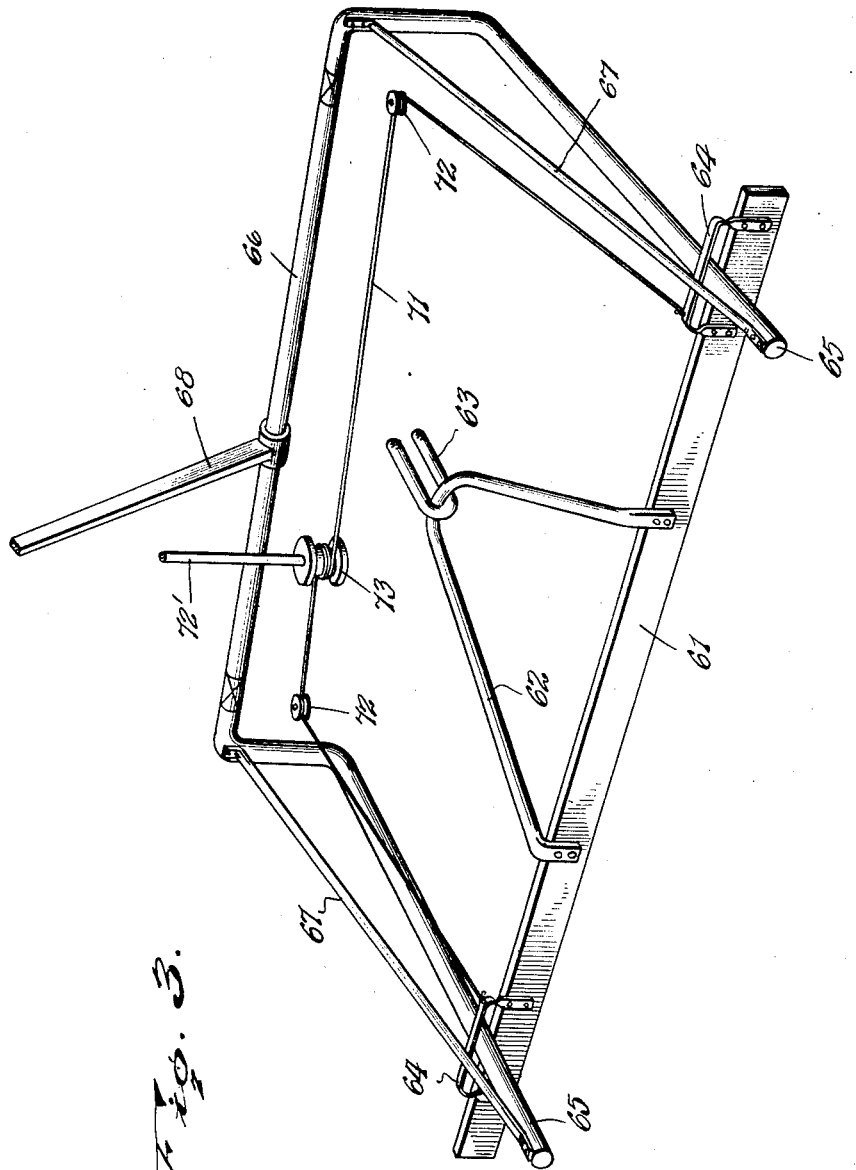

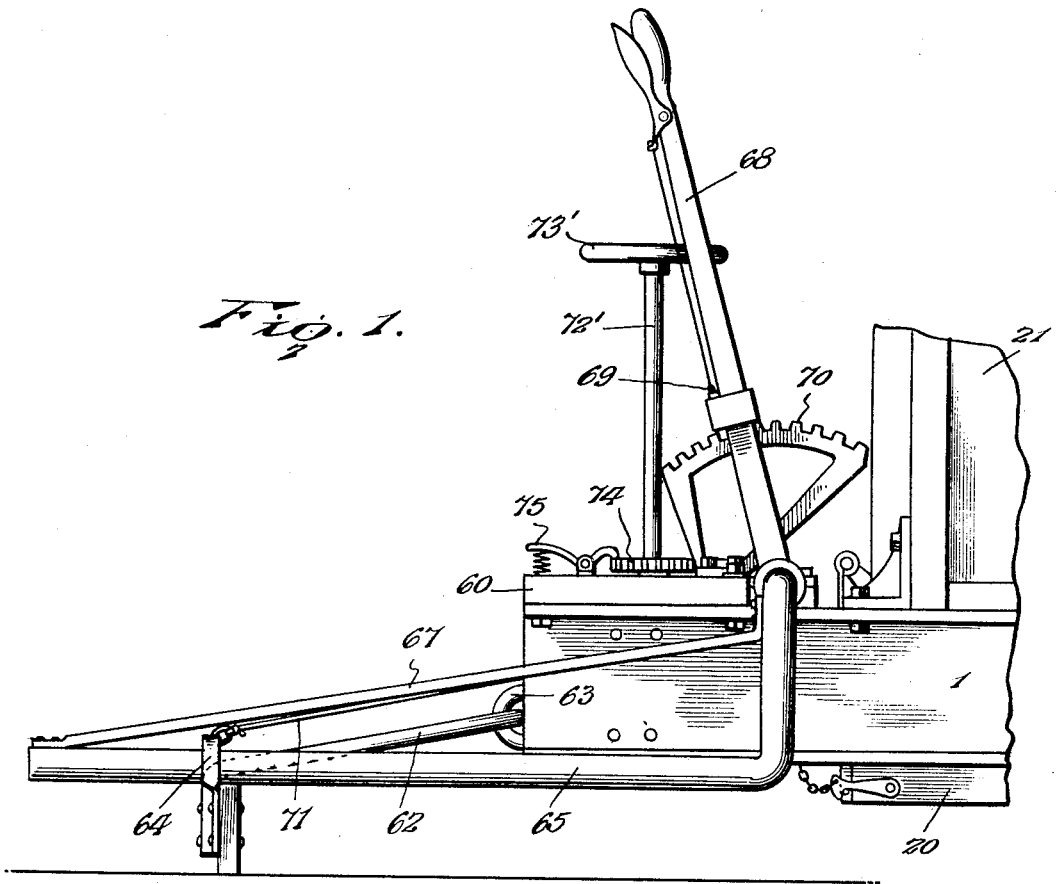
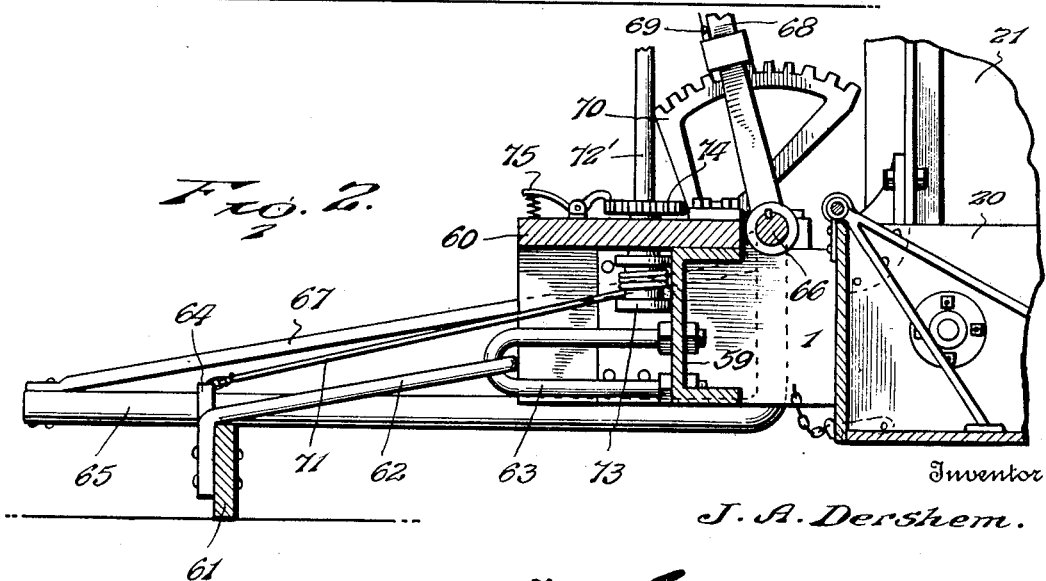

Nov. 7, 1933.  J. A. DERSHEM  1,933,663
LEVELER
Original Filed Oct. 15, 1931  2 Sheets-Sheet 2

Inventor
J. A. Dershem.
By Lacey & Lacey,
Attorneys

Patented Nov. 7, 1933

1,933,663

UNITED STATES PATENT OFFICE 1,933,663

LEVELER

James A. Dershem, Orchard, Colo.

Original application October 15, 1931, Serial No. 569,039. Divided and this application June 6, 1932. Serial No. 615,689

4 Claims. (Cl. 37—178)

This application is a division of an application filed by me October 15, 1931, Serial No. 569,039, the present invention relating to means for reducing the surface of the ground at the rear of an excavating scraper pan to a level condition. The invention is illustrated in the accompanying drawings and will be hereinafter fully described and particularly defined.

In the drawings, Fig. 1 is a side elevation of the rear portion of a scraper showing the invention, Fig. 2 is a central longitudinal section of the same, Fig. 3 is a perspective view of the leveler blade and its supports.

The numeral 1 designates a portion of the side bars of an excavating machine and 20 designates a portion of a scraper pan which is mounted upon the side bars and is adjusted or controlled through mechanism (not shown) mounted on an upper frame 21.

Upon the rear ends of the side bars 1 and upon the rear cross bar 59 of the main frame is secured a platform 60 upon which the operator stands while the machine is in use. A leveler or evener bar 61 is disposed at the rear of the platform and extends across and laterally somewhat beyond the path of the machine, said bar consisting of a plate of suitable material, set on edge, and connected with the rear cross bar 59 by draft devices consisting of a central clevis 62 secured to the evener bar and engaged through a loop 63 secured in and projecting rearwardly from the cross bar 59. It will be readily noted that the draft of the machine is thus transferred to the evener bar to draw it over the ground at the rear of the machine, and the clevis may be shifted through the loop to set the bar in a desired angular position. At the ends of the evener bar 61, loops or inverted stirrups 64 are secured thereto and rise above the upper edge thereof to receive the ends of the lifting arms 65 projecting rearwardly from the downturned ends of a rock shaft 66 which is journaled in suitable bearings upon the frame at the front edge of the platform 60, braces 67 extending from the shaft to the ends of the arms to resist sagging of the arms. A hand lever 68 is secured to the rock shaft 66, between the ends thereof, so that, by shifting the lever, the arms 65 may be rocked upwardly or downwardly and the evener bar consequently raised from the ground to an inactive position, as when the machine is being shifted from point to point, or lowered to the ground so as to ride on the surface of the same and reduce the same to a level. The lever 68 is, of course, equipped with the usual latch 69 cooperating with a holding segment or rack 70 so that the parts will be held in the set position. The loops 64 are somewhat elongated, as shown in Fig. 3, so that there may be relative lateral movement between the evener bar and the lifting arms so that the bar may be set in an angular position to deflect the surface earth to one or the other side. To accomplish such adjustment, I provide a cable 71 which has its ends secured to the respective loops 64 and its intermediate portion trained about guide pulleys 72, mounted on the underside of the platform, and secured to and wrapped around a drum 73, also mounted below the platform, whereby, if the drum be rotated, one end portion of the cable will be caused to wind thereon and the other end portion unwind therefrom so that the ends of the evener bar will be advanced or retracted and the bar thereby set in an oblique position with respect to the machine. The winding drum 73 is secured on the lower end of a vertical shaft 72', which extends upwardly through the platform, and is equipped, at its upper end, with a hand wheel 73'. Just above the platform, a holding rack 74 is secured upon the shaft, and a foot latch 75 is mounted on the platform in position to engage this rack and hold the shaft in a set position so that the angular disposition of the evener bar will be maintained.

Having thus described the invention, I claim:—

1. In a wheeled scraper, a main frame, a rock shaft mounted on said frame adjacent the rear end thereof, lifting arms extending rearwardly from the ends of the rock shaft, means for rocking the shaft whereby to raise or lower said arms, an evener bar, guide loops projecting above the upper edge of the evener bar and loosely engaged with said arms, a draft connection between the intermediate portion of the evener bar and the main frame, and braces connecting the ends of the arms with said rock shaft.

2. In a wheeled scraper, a main frame, an evener bar disposed at the rear of the frame, a draft loop secured in the frame at the rear end thereof, a clevis on the evener bar extending loosely through said loop, a cable having its ends connected with the evener bar adjacent the ends thereof, a winding drum to which an intermediate portion of the cable is secured whereby turning of the drum will wind one end portion of the cable and unwind the opposite end portion of the same to set the evener bar in an angular position, and means for turning said drum.

3. In a wheeled scraper, a main frame, an evener bar disposed at the rear of the main frame and provided with upstanding loops, a rock shaft journaled on said main frame adjacent the rear end thereof and provided with depending portions terminating in longitudinally disposed lifting arms the ends of which extend through the guide loops and project beyond the evener bar, braces forming a connection between the projecting ends of the lifting arms and the rock shaft, a draft connection between the evener bar and main frame, a winding drum mounted on the main frame, and a cable having its intermediate portion attached to the winding drum and its opposite ends fastened to the guide loops.

4. In a wheeled scraper, a main frame, a cross bar forming a part of the main frame, a rock shaft mounted on said main frame at the rear of the cross bar, lifting arms extending rearwardly from the ends of the rock shaft, an evener bar loosely engaged with said arms, means for rocking the shaft whereby to raise or lower said arms, a clevis connected with the cross bar, and a draft loop secured to the intermediate portion of the evener bar and extending through the clevis.

JAMES A. DERSHEM. [L. S.]